United States Patent Office 3,006,888
Patented Oct. 31, 1961

3,006,888
STABILIZED DIENE POLYMERS WITH
PARA-TERT.-ALKYL CATECHOL
Richard J. Reynolds, Walnut Creek, and Sven H. Ruetman, Oakland, Calif., assignors to Shell Oil Company, a corporation of Delaware
No Drawing. Filed Feb. 3, 1958, Ser. No. 712,663
2 Claims. (Cl. 260—45.95)

This invention relates to the stabilization of polymers of conjugated dienes. More particularly it relates to the stabilization of crystallizable polymers of conjugated dienes.

It is now known that conjugated dienes, as 1,3-butadiene, isoprene, and the like, may be polymerized to produce polymer wherein the steric configuration of the polymer is predominantly the cis 1,4-addition product. Such polymer, because of the high proportion of cis 1,4-addition product, tends to crystallize on cooling or stretching and hence is referred to as a crystallizable polymer. Such polymer is found to be useful in the preparation of improved synthetic rubber compositions which may have properties akin to or superior to natural rubber. The crystallizable polymer is prepared by what is now commonly termed "low pressure" methods which comprise conducting the polymerization of the conjugated diene at temperatures below about 120° C. and pressures below about 500 p.s.i.g. in the presence of a broad range of catalysts which are termed "low pressure catalysts." The resultant polymers are unsuitable and prone to gel, becoming increasingly insoluble in common rubber solvents on continued exposure to air, especially at elevated temperatures. It is well known that gelled polymers process poorly and give inferior vulcanizate quality depending upon the extent of exposure to air and the temperature. The present invention affords improvements in the stabilization of crystallizable polymers of conjugated dienes.

It is an object of this invention to provide compositions of crystallizable polymers of conjugated diene which have improved stability. It is another object of this invention to improve the stability of polymer of conjugated dienes wherein a predominant portion of the polymer is in the cis 1,4-form. Other objects will become apparent as the description of the invention proceeds.

These and other objects are accomplished by compositions comprising a major portion of crystallizable polymer of conjugated dienes wherein said polymer is in the cis 1,4-form and a minor amount of para-tert-alkyl catechol. Such compositions will be found to have improved stability in comparison to similar compositions which do not contain the para-tert-alkyl catechol, which functions as a stabilizer.

As indicated, the crystallizable polymer of conjugated dienes is prepared by the low pressure methods, which methods employ a wide range of catalysts which are termed "low pressure catalysts." In the most preferred methods of producing the cis 1,4-polymer the catalyst is prepared from two components, one of which is an organometallic compound wherein the metal atom is selected from groups I–III of the periodic table. The other component preferably is a metal salt particularly metal halides wherein the metal is selected from groups IV–VIII of the periodic table. Among the preferred organo-metallic compounds there may be mentioned organo-aluminum compounds such as triethyl aluminum, triisobutyl, aluminum, diethyl aluminum chloride, butyl lithium, amyl lithium, and the like. Among the preferred metal salts there may be mentioned particularly titanium halides as titanium trichloride, and the corresponding zirconium compounds. The catalysts are simply prepared by mixing the two components in an inert hydrocarbon diluent such as benzene, toluene, isooctane, heptane, and the like. The low pressure catalysts indicated above are merely representative of those which are preferred but low pressure catalysts are not limited thereto. Other low pressure catalysts include metal hydrides as diethyl aluminum hydride, lithium hydride, and the like, either alone or in combination with the metal salts of the type described above.

The low pressure methods for producing the polymer have the advantage that only low temperatures and low pressures are employed. All that is actually required is that the catalyst, contained in hydrocarbon dilution, be mixed with the conjugated diene which is to be polymerized. If desired, higher temperatures, i.e. in the order of 50–120° C., may be employed thereby producing faster polymerization rates. The polymerization normally is conducted in a closed reactor thereby excluding the atmosphere from the reaction medium which has the effect of keeping the reactants free of impurities which are harmful to the polymerization. If elevated temperatures are used then the pressure under which the reaction is conducted will depend upon the specific temperatures, the nature of the diluent, the quantity and nature of the conjugated diene and the like. Such pressures are termed "autogenic pressures" and refers to the pressure generated by the system under the conditions of reaction. It will be found that pressures in excess of 500 p.s.i.g. rarely, if ever, need be employed.

As the polymerization proceeds, the polymer goes into solution as it is formed so that at the termination of the polymerization a viscous solution is contained within the reactor. The polymer is recovered by adding a small amount of a lower alcohol such as methanol, ethanol, or the like, whereupon the polymer coagulates thereby forming a polymer slurry in the hydrocarbon diluent. The polymer is then recovered by any suitable means, as by filtration, and thereafter the polymer is washed a few times with additional alcohol-hydrocarbon mixture which may or may not be acidified with a mineral acid.

The present invention is based on the finding that the poor stability of the resultant polymer may be largely obviated by the incorporation therein of a minor amount of a para-tert-alkyl catechol. In considering the quantity of the stabilizer which is incorporated in the composition of this invention it is convenient to base that amount on the amount of polymer in the composition. The quantity of the stabilizer may range from about 0.5 to about 5 parts, by weight, per 100 parts of the polymer of the conjugated diene. More preferred, however, the amount ranges from about 1–3 parts per 100 as this amount is found to be suitable under a wide range of variables which affect the stability of the polymer. Among the most important variables which affect stability of the polymer there may be mentioned the molecular weight of the polymer and the type and amount of entrained catalyst residues. In the preferred embodiment it is desirable to wash the polymer a few times with an acidified lower alcohol-hydrocarbon mixture in order to bring the catalyst residue to a low level, that is in the order of about 5–10 parts per million by weight. Another factor which affects the stability of the polymer is the nature of the specific composition of the catalyst residue which in turn depends upon the catalysts composition selected to effect the polymerization. In the preferred embodiment it is found that the alkyl aluminums, such as triethyl aluminum or triethyl aluminum chloride, and titanium trihalides, as titanium trichloride, are the most preferred catalysts types as their residues are less injurious to stability. The preferred catalyst types indicated above have the advantage also that they produce polymer in higher yield at suitable rates. Furthermore, those catalyst compositions are capable of producing polymer having a cis 1,4-content which may range from about 60–95% and even higher.

The para-tert-alkyl catechol employed to stabilize the polymer of the conjugated diene has the structural formula

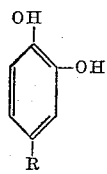

wherein R is a tertiary alkyl radical bonded directly to the aromatic nucleus. In the preferred embodiment the alkyl radical is tertiary butyl as that species is the most economical to use. Other tertiary alkyl radicals may be employed but the selection thereof is merely a matter of choice and it may contain as many as 10 carbon atoms with 4–8 carbon atoms being particularly preferred.

The present invention is particularly suitable for the stabilization of polymers of lower conjugated dienes as 1,3-butadiene and isoprene but this invention is not limited thereto as polymers of other conjugated dienes may be suitably stabilized according to the present invention. Among the polymers of other conjugated dienes which may be stabilized according to the present invention there may be mentioned 2,3-dimethyl-1,3-butadiene, 2-ethyl-1,3-butadiene, 4-methyl-1,3-hexadiene, 2-methyl-1,3-pentadiene and the like.

The present invention has its greatest advantage in the stabilization of rubber compositions prepared using polymers of conjugated dienes such as 1,3-butadiene and isoprene. Such rubber compositions may contain a number of additional ingredients as is employed in rubber formulations. Such ingredients include high abrasion furnace black, plasticizers, tackifiers, fillers, curing agents, and the like.

The superiority of the para-tert-alkyl catechol stabilizers is indicated in the following table wherein tests were conducted to compare the effectiveness of various compounds as stabilizers. In conducting these tests 2 gms. of polybutadiene having a cis 1,4-content of about 96% is dissolved in benzene at room temperature. Thereafter 1.5 parts by weight of the indicated antioxidants, per 100 parts of rubber, is dissolved in a small amount of benzene and added to the previously prepared solution of the polymer in benzene. After thoroughly mixing the solution is poured into a Petri dish and the benzene is permitted to evaporate whereupon there is formed a film. The intrinsic viscosity is an indication of the molecular weight and in the following table the variation of the intrinsic viscosity of the soluble fraction of the polymer and the gel content after aging for the indicated periods at 70° C., shows the stability of the polymer. The intrinsic viscosity is determined at 25° C. in toluene. The percent gel is determined using the conventional "Harris Cage Method."

Table

|  | Film dried. 72 hrs. at 25° C. | Film aged | |
|---|---|---|---|
|  |  | 24 hrs. at 70° C. | 48 hrs. at 70° C. |
| Antioxidant—none: |  |  |  |
| Percent gel | 56.6 | 65.0 | 77.0 |
| Intrinsic viscosity of soluble fraction | 0.26 | 0.13 |  |
| Tris(nonylphenyl)phosphite:[1] |  |  |  |
| Percent gel | 16.2 | 79.6 | 86.1 |
| Intrinsic viscosity of soluble fraction | 0.61 | 0.17 |  |
| Phloroglucinol: |  |  |  |
| Percent gel | 70.3 | 68.8 | 77.8 |
| Intrinsic viscosity of soluble fraction | .30 | .18 |  |
| B-conidendrol: |  |  |  |
| Percent gel | 5.0 | 27.7 | 46.4 |
| Intrinsic viscosity of soluble fraction | 1.03 | 0.55 | 0.33 |
| p-Tert-butyl catechol: |  |  |  |
| Percent gel | 0 | 2.7 | 26.8 |
| Intrinsic viscosity of soluble fraction | 0.72 | 0.64 | 0.48 |

[1] As "Polygard"—product of Naugatuck Chemical Div., U.S. Rubber Co.

In a similar manner like results are obtained with p-tert-amyl-catechol and other p-tert-alkyl catechols when applied to 1,3-butadiene, isoprene and other polymers of conjugated dienes. It is found that somewhat better results are obtained when the quantity of the stabilizer is increased but at about 4% by weight, the improvement is not very marked.

From the foregoing it will be seen that the present invention effects improved stability of polymers of conjugated dienes wherein the polymer is predominantly in the cis 1,4-form and applies equally irrespective of the methods or techniques used to prepare the polymer. Accordingly the methods of preparing the cis 1,4-polymer are immaterial to the present invention.

We claim as our invention:

1. A composition comprising a polymer of butadiene wherein at least 60% of the polymer is in the cis 1,4-form, and from 0.5–5.0 parts per hundred of para-tert-alkyl catechol, said alkyl group having from 4 to 8 carbon atoms.

2. The composition of claim 1 in which the para-tert-alkyl catechol is para-tert-butyl catechol.

References Cited in the file of this patent

UNITED STATES PATENTS

| 2,181,102 | Stoesser et al. | Nov. 21, 1939 |
| 2,304,466 | Matheson et al. | Dec. 8, 1942 |
| 2,831,817 | Ecke et al. | Apr. 22, 1958 |

FOREIGN PATENTS

| 714,772 | Great Britain | Sept. 1, 1954 |